United States Patent
Wang et al.

(10) Patent No.: US 10,268,655 B2
(45) Date of Patent: Apr. 23, 2019

(54) METHOD, DEVICE, SERVER AND STORAGE MEDIUM OF SEARCHING A GROUP BASED ON SOCIAL NETWORK

(71) Applicant: PING AN TECHNOLOGY (SHENZHEN) CO., LTD., Shenzhen (CN)

(72) Inventors: Jianzong Wang, Shenzhen (CN); Zhangcheng Huang, Shenzhen (CN); Tianbo Wu, Shenzhen (CN); Jing Xiao, Shenzhen (CN)

(73) Assignee: PING AN TECHNOLOGY (SHENZHEN) CO., LTD., Shenzhen (CN)

( * ) Notice: Subject to any disclaimer, the term of this patent is extended or adjusted under 35 U.S.C. 154(b) by 0 days.

(21) Appl. No.: 15/578,407

(22) PCT Filed: Jun. 28, 2017

(86) PCT No.: PCT/CN2017/090571
§ 371 (c)(1),
(2) Date: Nov. 30, 2017

(87) PCT Pub. No.: WO2018/184305
PCT Pub. Date: Oct. 11, 2018

(65) Prior Publication Data
US 2018/0300413 A1 Oct. 18, 2018

(30) Foreign Application Priority Data
Apr. 7, 2016 (CN) .......................... 2017 1 0224884

(51) Int. Cl.
*G06F 17/30* (2006.01)
*G06F 16/9535* (2019.01)
(Continued)

(52) U.S. Cl.
CPC ...... *G06F 16/9535* (2019.01); *G06F 16/2246* (2019.01); *G06F 16/248* (2019.01);
(Continued)

(58) Field of Classification Search
USPC ......................................... 707/722
See application file for complete search history.

(56) References Cited

U.S. PATENT DOCUMENTS 8,135,800 B1 3/2012 Walsh et al.
2012/0290562 A1* 11/2012 Wable ............... G06F 17/30867
707/722

(Continued)

FOREIGN PATENT DOCUMENTS

CN 103595734 A 2/2014
CN 103823888 A 5/2014
(Continued)

OTHER PUBLICATIONS

Tree-core and tree-coritivity of graphs, Zhu et al., pp. 754-759 (Year: 2014).*
(Continued)

*Primary Examiner* — Jean M Corrielus
(74) *Attorney, Agent, or Firm* — Platinum Intellectual Property LLP

(57) ABSTRACT

A method of searching a group based on a social network includes: receiving a group search request transmitted by a query terminal, wherein the group search request contains a specified query user identification (ID), a group scale and a group coritivity; retrieving a pre-generated social network graph; using the user node corresponding to the query user ID as a starting node to perform search expansion according to the social network graph, and determining a user node having the maximum number of adjacent nodes in each search expansion layer as a group member until the number (Continued)

of determined group members equals to the group scale in the social network graph; a first level of the expansion layer includes the user node, which is an adjacent node of the query user, and the user node included in a next level of expansion layer is an adjacent node of the group member determined by the upper level of the expansion layer; and determining that a group coritivity of the group to be searched is not less than the specified group coritivity, and returning the group to be searched as a query result to the query terminal for displaying.

16 Claims, 8 Drawing Sheets

(51) Int. Cl.
G06F 16/248 (2019.01)
G06F 16/22 (2019.01)
G06F 16/901 (2019.01)

(52) U.S. Cl.
CPC .... *G06F 16/9024* (2019.01); *G06F 17/30327* (2013.01); *G06F 17/30554* (2013.01); *G06F 17/30867* (2013.01); *G06F 17/30958* (2013.01)

(56) References Cited

U.S. PATENT DOCUMENTS

| | | | |
|---|---|---|---|
| 2014/0067943 A1 | 3/2014 | Jackson et al. | |
| 2014/0089237 A1 | 3/2014 | Adibi | |
| 2014/0372385 A1* | 12/2014 | Martino | G06F 17/3089 707/689 |
| 2015/0026211 A1* | 1/2015 | Martino | G06F 17/3089 707/770 |
| 2017/0091309 A1 | 3/2017 | Chung et al. | |

FOREIGN PATENT DOCUMENTS

| | | |
|---|---|---|
| CN | 103838831 A | 6/2014 |
| CN | 104700311 A | 6/2015 |
| CN | 104731962 A | 6/2015 |
| CN | 105022761 A | 11/2015 |
| CN | 105893382 A | 8/2016 |
| TW | 201329738 A | 7/2013 |
| WO | 2009107416 A1 | 9/2009 |

OTHER PUBLICATIONS

Coritivity-based influence maximization in social networks, Wu et al., pp. 1-14 (Year: 2014).*
Scalable and parallelizable influence maximization with Random Walk Ranking and Rank Merge Pruning, Kim et al., pp. 1-19 Year: 2017).*
Influence maximization in social networks under an independent cascade-based model, Wang et al., pp. 1-15 (Year: 2015).*
International Search Report and Written Opinion for PCT/CN2017/090571 dated Sep. 1, 2017.
Lixue, Feng; "Complex network search strategy combined with Max degree and Min clustering coefficient", China Master's Theses Full-text Database; Sep. 15, 2011.
SIPO Office Action of the corresponding Chinese Patent Application No. 201710224884.2, dated Nov. 16, 2017.
Australian Office Action dated Nov. 7, 2018 for the corresponding Australian patent application.
TIPO Office Action dated Aug. 27, 2018 for the corresponding Taiwanese patent application.

* cited by examiner

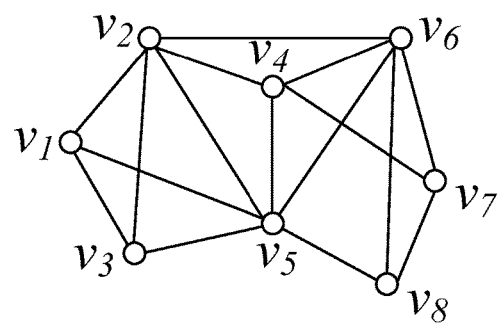
FIG. 4
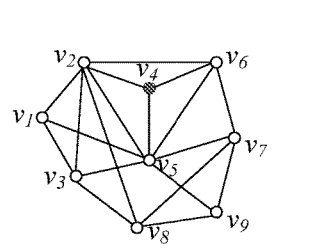
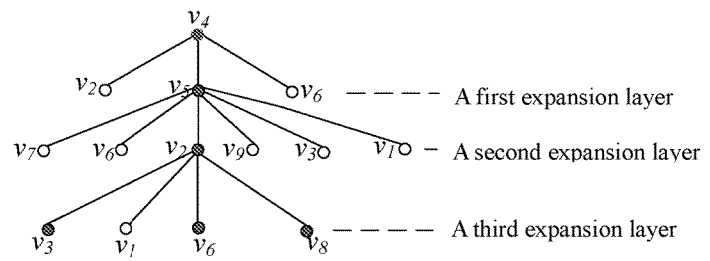
FIG. 5A            FIG. 5B (a) Social network graph  (b) BFS tree using $v_1$ as a root  (c) Pruned social network graph

METHOD, DEVICE, SERVER AND STORAGE MEDIUM OF SEARCHING A GROUP BASED ON SOCIAL NETWORK

CROSS-REFERENCE TO RELATED APPLICATION

This application claims priority to Chinese Patent Application No. 201710224884.2, entitled "METHOD AND DEVICE OF SEARCHING A GROUP BASED ON SOCIAL NETWORK" filed Apr. 7, 2017, the contents of which is expressly incorporated by reference herein in its entirety.

FIELD OF THE INVENTION

The present disclosure relates to a field of computer application technology, and more particularly relates to a method, a device, a server, and a storage medium of searching a group based on a social network.

BACKGROUND OF THE INVENTION

Online social network has become an indispensable part of people's lives, which brings a huge challenge to social network analysis. Groupment is one of the most important attributes of social networks, thus it has gradually become a trend to study the groupment based on the social network.

In the life and work, a group is needed to be searched from the social network to work, such as preparing a diner and so on. It is a conventional method of searching the group to determine all the possible combinations of nodes in social network data firstly according to the number of groups, and then scanning all the searched combinations by the other conditions of the group one by one. The calculation is very huge and the search efficiency is extremely low.

SUMMARY OF THE INVENTION

According to various embodiments of the present disclosure, a method, a device, a server, and a storage medium of searching a group based on a social network are provided.

A method of searching a group based on a social network includes:

receiving a group search request transmitted by a query terminal, the group search request contains a specified query user identification (ID), a specified group scale, and a group coritivity, the group coritivity defines a minimum number of group members adjacent to other members;

retrieving a pre-generated social network graph in response to the group search request, the social network graph is generated according to social relation data in a social network site, and the social network graph comprises a plurality of user nodes and an edge set used to connect the user nodes;

performing search expansion using the user node corresponding to the query user ID as a starting node according to the social network graph, and determining a user node having a maximum number of adjacent nodes in the social network graph as a group member in each search expansion layer until the number of determined group members equals to the group scale;

the user node included in a first level of the expansion layer is an adjacent node of the query user, and the user node included in a next level of expansion layer is the user node adjacent to the group member determined by an upper level of the expansion layer;

forming a group to be searched by the determined group members and the query user; and determining whether a group coritivity of the group to be searched is no less than the specified group coritivity or not, and feeding back the group to be searched as a query result to the query terminal for displaying when the group coritivity of the group to be searched is no less than the specified group coritivity.

A device of searching a group based on a social network includes:

a searching request module used to receive a group search request transmitted by a query terminal, the group search request contains a specified query user ID, a specified group scale, and a group coritivity, the group coritivity defines a minimum number of group members adjacent to other members;

a social network graph retrieving module used to retrieve a pre-generated social network graph in response to the group search request, the social network graph is generated according to social relation data in a social network site, and the social network graph comprises a plurality of user nodes and an edge set used to connect the user nodes;

a layer searching module used to perform search expansion at a specified number of layers using the user node corresponding to the query user ID as a starting node according to the social network graph, and used to determine a user node having a maximum number of adjacent nodes in the social network graph as a group member in each search expansion layer, which guarantees that the number of the determined group members satisfies the specified group scale;

the user node included in a first level of the expansion layer in an expansion process is an adjacent node of the query user, and the user node included in a next level of expansion layer is the user node adjacent to the group member determined by an upper level of the expansion layer;

a group determining module used to form a group to be searched by the determined group members and the query user; and a group feeding back module used to determine whether a group coritivity of the group to be searched is no less than the specified group coritivity or not, and used to feed back the group to be searched as a query result to the query terminal for displaying when the group coritivity of the group to be searched is no less than the specified group coritivity.

A server includes a processor, and a memory storing computer executable instructions, which, when executed by the processor cause the processor to perform steps including:

receiving a group search request transmitted by a query terminal, the group search request contains a specified query user identification (ID), a specified group scale, and a group coritivity, the group coritivity defines a minimum number of group members adjacent to other members;

retrieving a pre-generated social network graph in response to the group search request, the social network graph is generated according to social relation data in a social network site, and the social network graph comprises a plurality of user nodes and an edge set used to connect the user nodes;

performing search expansion using the user node corresponding to the query user ID as a starting node according to the social network graph, and determining a user node having a maximum number of adjacent nodes in the social network graph as a group member in each search expansion layer until the number of determined group members equals to the group scale;

the user node included in a first level of the expansion layer is an adjacent node of the query user, and the user node included in a next level of expansion layer is the user node adjacent to the group member determined by an upper level of the expansion layer;

forming a group to be searched by the determined group members and the query user; and;

determining whether a group coritivity of the group to be searched is no less than the specified group coritivity or not, and feeding back the group to be searched as a query result to the query terminal for displaying when the group coritivity of the group to be searched is no less than the specified group coritivity.

At least one non-transitory computer-readable medium storing computer executable instructions, which, when executed by at least one processor cause the at least one processor to perform steps including:

receiving a group search request transmitted by a query terminal, the group search request contains a specified query user identification (ID), a specified group scale, and a group coritivity, the group coritivity defines a minimum number of group members adjacent to other members;

retrieving a pre-generated social network graph in response to the group search request, the social network graph is generated according to social relation data in a social network site, and the social network graph comprises a plurality of user nodes and an edge set used to connect the user nodes;

performing search expansion using the user node corresponding to the query user ID as a starting node according to the social network graph, and determining a user node having a maximum number of adjacent nodes in the social network graph as a group member in each search expansion layer until the number of determined group members equals to the group scale;

the user node included in a first level of the expansion layer is an adjacent node of the query user, and the user node included in a next level of expansion layer is the user node adjacent to the group member determined by an upper level of the expansion layer; and forming the determined group members and the query user as a group to be searched;

determining that a group coritivity of the group to be searched is not less than the specified group coritivity, and returning the group to be searched as a query result to the query terminal for displaying.

The details of one or more embodiments of the present disclosure will be presented with reference to the following drawings and description. Other characteristic, purposes and advantages of the present disclosure will be more apparent from the specification, drawing and claims.

BRIEF DESCRIPTION OF THE DRAWINGS

FIG. 4 is a schematic diagram of a social network graph according to an embodiment;

FIGS. 5A-5B are schematic diagrams illustrating a layer search which uses a query user as a starting node according to an embodiment;

DETAILED DESCRIPTION OF THE EMBODIMENTS

The present disclosure will be described in details with reference to the accompanying drawings and embodiments such that the purpose, technical solution and advantages of the present disclosure will be more apparent. The various embodiments of the invention may, however, be embodied in many different forms and should not be construed as limited to the embodiments set forth herein. Rather, these embodiments are provided so that this disclosure will be thorough and complete, and will fully convey the scope of the present disclosure to those skilled in the art.

Figure 1:
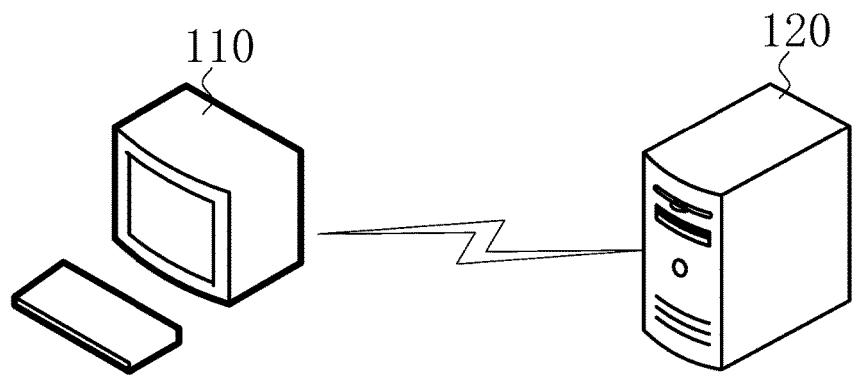
FIG. 1 is a schematic diagram of an implementation environment of a method of searching a group based on a social network according to an embodiment.

FIG. 1 is a schematic diagram of an implementation environment of a method of searching a group based on a social network, which includes a query terminal 110 and a server 120. The query terminal 110 can communicate with the server 120 via the network. The query terminal 110 can be at least one of a smart phone, a tablet computer, a notebook computer, and a desktop computer, but is not limited thereto. The server 120 can be an independent physical server or a server cluster of multiple physical servers. The query terminal 110 transmits a group search request to the server 120 to specify a query user, a group scale, and a group coritivity. The server 120 performs a hierarchical search expansion to a data source (social network graph) using the query user as a center according to the specified group query requirement of the query terminal (the group scale and the group coritivity). The server 120 determines a user node having the maximum number of adjacent nodes in the social network graph as a group member in each search expansion layer, and the group scale requirement is ensured during the determination process. After an initial determination of the group, and the coritivity verification of the determined group is performed. If a coritivity requirement is met, the group information corresponding to the searched group is returned to the query terminal.

Figure 2:
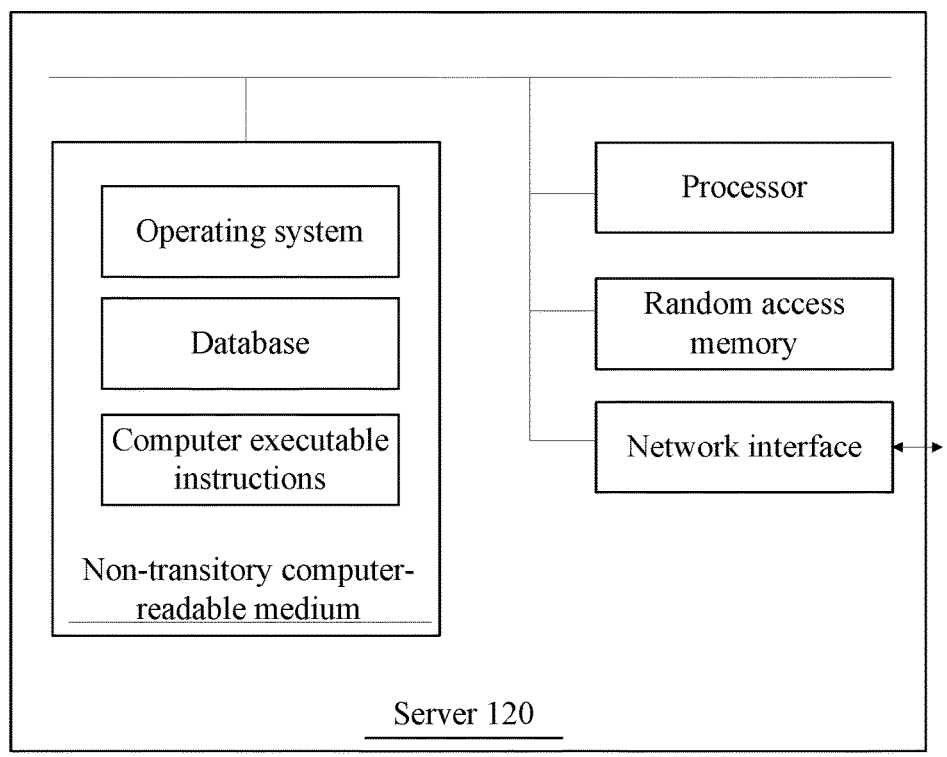
FIG. 2B is a block diagram of a server according to an embodiment.

Referring to FIG. 2, according to an embodiment, a server 120 is provided. The server 120 includes a processor, a non-transitory storage medium, a random access memory (RAM), a network interface, a display screen, and a input device, which are coupled via a system bus. The non-transitory storage medium of the server 120 stores an operating system, database and computer-readable instructions, which, when executed by the processor cause the processor to perform a method of searching a group based on a social network shown in FIG. 3. The database is used to store data, such as storing social network graphs and other data related to the process of executing the method of searching a group based on the social network. The processor is used to provide computation and control capabilities to support the entire operation of the server 120. The RAM in the server provides an operation environment with a high speed cache for the operating system, the database, and the computer-readable instructions in the non-transitory storage medium. The network interface is used to communicate with the query terminal 110. Persons skilled in the art can understand that, the structure of the server shown in FIG. 2 is only a part of the structure of the solution of the present disclosure, which does not impose limitation to the server. Specifically, the server can include more or less components than those shown in the drawing, or can combine some components, or can have different component deployment.

Figure 3:
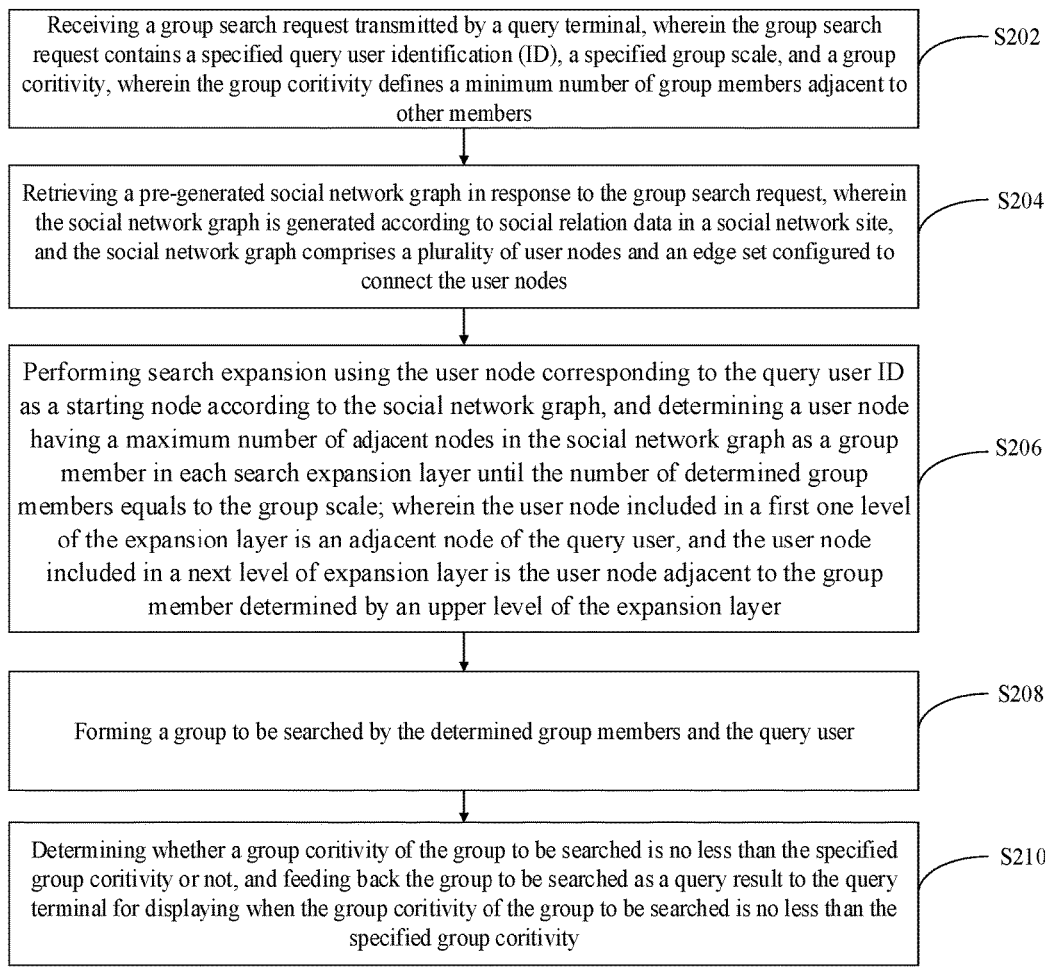
FIG. 3 is a flowchart of a method of searching a group based on a social network according to an embodiment.

Referring to FIG. 3, according to an embodiment, a method of searching a group based on a social network is provided, which can be applied to the server shown in FIG. 2. The method includes steps as follows:

In step S202, a group search request transmitted by a query terminal is received. The group search request contains a specified query user identification (ID), a specified group scale, and a group coritivity. The group coritivity defines a minimum number of other group members adjacent to group members.

The query interface is displayed in the query terminal, and users can set a query conditions in the query interface. Specifically, the query conditions include the group scale and the group coritivity. As defined herein, the group scale refers to the number of group members; and the group coritivity is a minimum number of other group members adjacent to each group members in the determined group members.

The query conditions are explained in a specific circumstance. Assuming that Alice wants to host a dinner for 10 people (including Alice), in order to avoid the dinner from becoming too awkward due to unfamiliarity between the participants, Alice makes query requirements as follows: 1) the scale of dinner is 10 people (including Alice); 2) each participant at least knows the other three participants. Requirement 1) is the group scale, and requirement 2) is the group coritivity.

Referring to FIG. 4, there is a group including six group members, each of which is at least adjacent to three other group members, thus the group has a group coritivity of three.

The user can set the group scale and the group coritivity by an input control in the query interface. In addition, the query user can be specified by the query interface. The query user is a specified group member, i.e., the group member which must be included. For example, Alice is the query user in the exemplary circumstance.

According to an embodiment, before specifying the query user, a query social network site, such as a microblog, a Microsoft service network (MSN) should be set. The server will push the corresponding query user ID to a terminal control corresponding to the query user according to the selected social network sites, which enables the user to select the query user ID through the terminal control.

In a default state, the query user is the user ID of the query terminal user in the selected database. For example, the selected social network site is the microblog, the user ID of the query terminal is Litch. In the default state, the query user is the ID of the Litch in the microblog, such as Litchsweety.

According to an embodiment, the user ID of the query terminal user in the specified social website can be automatically queried by the registered identity information (e.g., a telephone number, a real name, an identity number, etc.) in the registration information.

In step S204, a pre-generated social network graph is retrieved in response to the group search request. The social network graph is generated according to social relation data in a social network site, and the social network graph includes a plurality of user nodes and an edge set used to connect the user nodes.

The social network graphs are generated according to social relation data in pre-specified social network sites. The social relation in the social network can be friends, mutual attention and a relation associated with each other. The social relations include two elements, which are users and associated relation thereof. The social network graph generated according to the social relation identifies the users through the nodes, and identifies the associated relation thereof through the edge between the nodes, i.e., FIG. 4 is the social network graph.

The social network graph generated according to the social relation data of the social network is a huge and sophisticated social network image. According to conventional manners, it is a major project to screen the group satisfying the query conditions, which will cost more time and larger computing resources. In the illustrated embodiment, the purpose of searching groups satisfying the query conditions will be quickly and accurately reached by determining a center node layer-by-layer, the specific steps will be described hereinafter.

In step S206, search expansion is performed by using the user node corresponding to the query user ID as a starting node according to the social network graph. A user node having a maximum number of adjacent nodes in the social network graph is determined as a group member in each search expansion layer until the number of determined group members equals to the group scale in the social network graph. The user node included in a first level of the expansion layer is an adjacent node of the query user, and the user node included in a next level of expansion layer is the user node adjacent to the group member determined by an upper level of the expansion layer.

Firstly, the query user ID is located in the social network graph, and a layer expansion is performed by using the located user node as the starting node to generate an expansion subgraph.

Specifically, the user node included in the first expansion layer is the user node adjacent to the user node corresponding to the query user. Referring to the social network graph in FIG. 5A, assuming that the query user specified by the query terminal is a user node v4, thus the user nodes included in the first expansion layer are nodes adjacent to the user node v4, which are v2, v5, and v6, respectively, as shown in the expansion subgraph in FIG. 5B.

After the user nodes in the first expansion layer are determined, a user node is determined as a group member from the user nodes included in the first expansion layer. Specifically, the user node having the maximum number of adjacent nodes is determined as the group member. In the first expansion layer, the adjacent nodes of the user node v2 in the social network graph is 6; the adjacent nodes of the user node v5 in the social network graph is 7; and the adjacent nodes of the user node v6 in the social network graph is 4. Therefore, v5 is selected as the group member.

After a new group member is determined, an expansion of the next level of expansion layer is performed by using the user node corresponding to the new group member as a center node. A second expansion layer is expanded by using v5 as the new center node. Similarly, the user nodes included in the secondary expansion layer are the user nodes adjacent to v5. It should be noted that the user node of the determined group member is not included in a new expansion layer. Referring to FIG. 5B, although the node v4 is adjacent to the node v5, v4 is the user node that has been determined as the group member, thus node v4 is not included in the second expansion layer. The user nodes included in the second expansion layer are respectively: v1, v2, v3, v6, v7, and v9. The node having the maximum number of adjacent user nodes is determined as v2 (the number of adjacent nodes is 6) according to the second expansion layer. Therefore, v2 is determined as the group member.

If the specified group scale is 4, then only the last group member needs to be determined, i.e., it is enough to expand to the third expansion layer. Similarly, user nodes included in the third expansion layer are: v1, v8, v3, and v6. In the social network graph, the number of adjacent nodes of v1, v8, v3, v6 are: 3, 4, 4, and 4. Thus, the determined group member can be v8, v3, or v6.

In Step S208, a group to be searched is formed by the determined group members and the query user.

According to step S206, the determined group to be searched can be {v4, v5, v2, v6}, {v4, v5, v2, v3}, or {v4, v5, v2, v8}.

The group network graph of the group to be searched is constructed according to group members and relations thereof (the associated relations can be determined from the social relation graph).

Figure 6A:
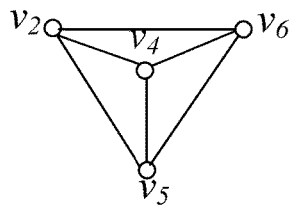
FIGS. 6A-6C are schematic diagrams illustrating groups to be searched by a layer search according to an embodiment.
Figure 6B:
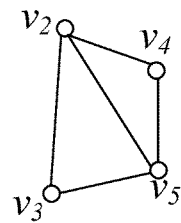
Figure 6C:
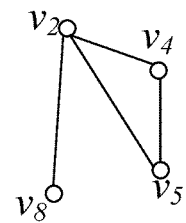

The group network graphs of {v4, v5, v2, v6}, {v4, v5, v2, v3}, {v4, v5, v2, v8} are shown as FIGS. 6A, 6B, and 6C, respectively.

In step S210, whether the group coritivity of the group to be searched is no less than the specified group coritivity or not is determined, and if so, the group to be searched is fed back as a query result to the query terminal for displaying.

The coritivity of groups to be searched can be determined according to FIGS. 6A-6C. Coritivity of (V4, v5, v2, v3) is 3; coritivity of {v4, v5, v2, v6} is 2; coritivity of {v4, v2, v2, v3} is 2; and coritivity of {v4, v5, v2, v8} is 1. {V4, v5, v2, v6} is the group that satisfies the query conditions if the group coritivity specified by the query terminal is 3. {V4, v5, v2, v6} and {v4, v5, v2, v3} are the groups that satisfy the query conditions if the group coritivity specified by the query terminal is 2. The group that satisfies the query conditions will be pushed to the query terminal.

According to the method of searching the group based on the social network in the illustrated embodiment, the query user is used as the center to perform layer expansion, which only depends on the connection relation of each node in the social network data. The expansion process is simple and quick, there is no need to screen all possible combinations which may be searched one by one, thereby improving the query efficiency. In addition, the selected group members have higher coriritivity, which ensures that the searched group has a higher intimacy degree.

According to an embodiment, in step S204, a pre-generated social network graph is retrieved in response to the group search request. The social network graph is generated according to social relation data in a social network site. The social network graph includes a plurality of user nodes and an edge set used to connect the user nodes. After the step S204, the method further includes the step: the pruning process is performed to the retrieved social network graph. In step S206, the user node corresponding to the query user ID is used as the starting node to perform search expansion according to the social network graph. A user node having the maximum number of adjacent nodes in the social network graph is determined as the group member in each search expansion layer until the number of determined group members satisfies the specified group scale. The user node included in a first level of the expansion layer is an adjacent node of the query user, and the user node included in a next level of expansion layer is the user node adjacent to the group member determined by an upper level of the expansion layer.

Figure 7:
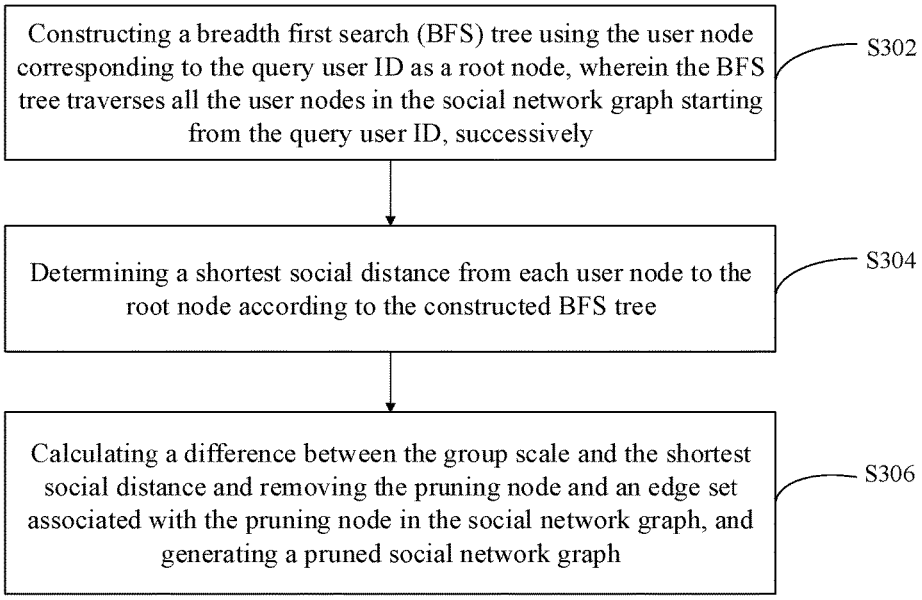
FIG. 7 is flowchart involving nodes pruning in a social network graph according to an embodiment.

Specifically, referring to the FIG. 7, the pruning process is performed to the retrieved social network graph, which includes steps as follows:

In step S302: a breadth first search (BFS) tree is constructed by using the user node corresponding to the query user ID as a root node, the BFS tree traverses all the user nodes in the social network graph starting from the query user ID, successively.

The BFS starts from a vertex v0 of the graph, and after the vertex v0 is accessed, adjacent vertexes w1, w2, of v0 which have not been accessed will be accessed, successively. And then each unexplored adjacent nodes of w1 and each unexplored adjacent nodes of w2 are searched and accessed, successively. Vertices communicating with v0 and having a path with length of 1, 2 are accessed starting from v0 hierarchy and successively from near to far, until all vertices in a connected graph are accessed once.

Figure 8:
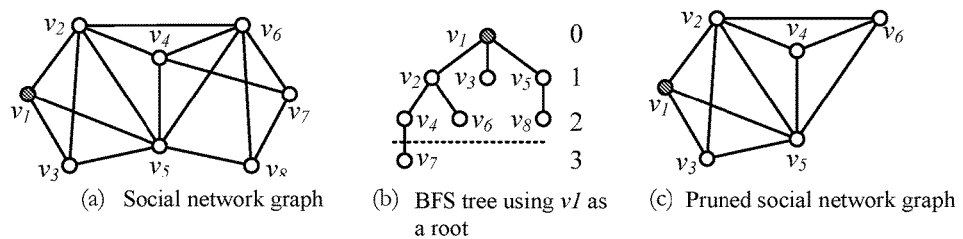
FIG. 8 is a schematic diagram illustrating nodes pruning in a social network graph according to an embodiment.

According to the social network graph in FIG. 8 (a), the BFS tree is constructed by using the query user v1 as the root node. FIG. 8 (b) is a schematic diagram of the BFS tree constructed based on the query user v1 and according to the social network graph.

In step S304, a shortest social distance from each user node to the root node is determined according to the constructed BFS tree.

The social distance from each user node to the root node (the query user) can be determined according to the constructed BFS tree. The social distance determined by the BFS tree is the shortest social distance. Referring to FIG. 8 (b), the shortest social distance of V2, V3 and V5 is 1, the shortest social distance of V4, V6, V8 is 2, and the shortest social distance of V7 is 3.

In step S306: a difference between the group scale and the shortest social distance is calculated. The user node corresponding to the difference being not greater than 1 is defined as a pruning node. The pruning node and an edge set associated with the pruning node are removed from the social network graph, and a pruned social network graph is generated.

Assuming that the specified group scale is 4, as for the user node of v7 whose shortest social distance is 3, the difference between the group scale 4 and the shortest social distance 3 is no greater than 1, thus the user node of v7 is the pruning node. The user node corresponding to shortest social distance being greater than 3 is also the pruning node.

In step S308, whether there exists a user node which does not satisfy the coritivity requirement in the user nodes of the pruned social network graph or not is searched. If the user node exists, the user node in the pruned social network is removed, and the pruned social network graph is updated.

Since there is a requirement to the group coritivity in the query conditions, the coritivity of the group is actually the coritivity of the group members. If the coritivity of the user node in the searched social network does not satisfy the requirement, when it is used as the group member, the coritivity in the group will no more satisfy the requirement. Therefore, the coritivity of the used nodes in the pruned network graph should be examined. If there exists a user node which does not satisfy the coritivity requirement, then the user node should be pruned again.

Assuming that the coritivity of the searched group is 3, after the node v7 whose shortest social distance does not satisfy the conditions is pruned, the coritivity of the node v8 is 2, which is less than the coritivity of the group. Therefore, the node of v8 is pruned again based on the pruned social network graph. Finally, the social network after pruning is shown in FIG. 8(c).

It will be simpler to perform the layer expansion based on the pruned social network graph, and the generated subgraph will be simplified, thereby improving the efficiency of the group query.

Figure 9:
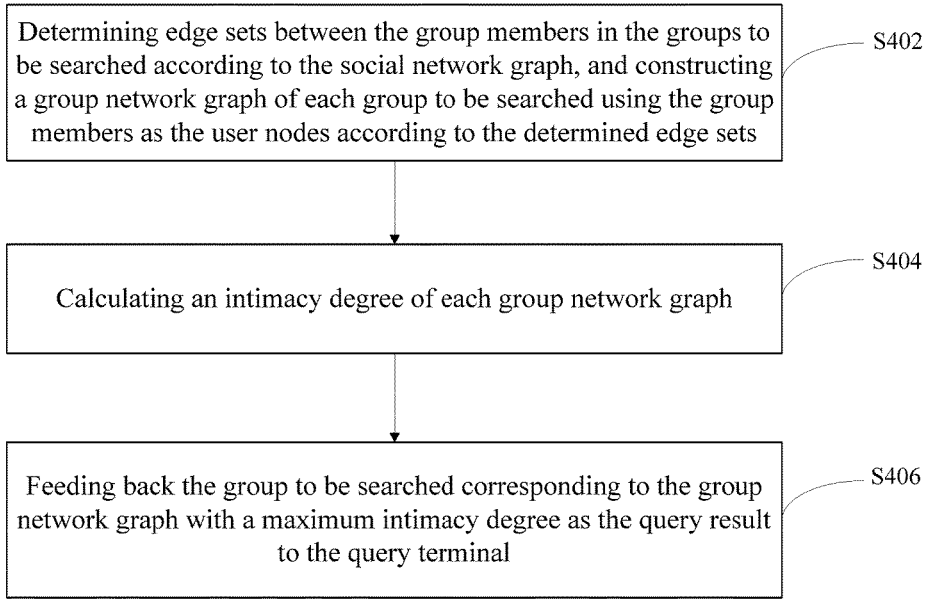
FIG. 9 is a flowchart involving choosing an optimization group, when there is a plurality of groups satisfying a query condition according to an embodiment.

According to an embodiment, referring to FIG. 9, when a plurality of groups satisfy the query conditions (the group scale and the group coritivity) and searched by the layer expansion, the method of searching the group based on the social network also includes:

In step S402: edge sets between each group members in the groups to be searched are determined according to the social network graph, and group network graphs of each group to be searched are constructed by using the group members as the user nodes according to the determined edge sets.

Group member information can be determined according to the groups to be searched determined by the layer expansion. The relations between the group members can be determined according to the group member information and the social network graph (if the social network graph has been pruned, it should be the pruned social network graph). The group members are used as the user nodes, the relations between the group members are used as the edge set, thus the network graphs of the groups to be searched can be generated.

If the specified coritivity is 1, the group network graphs of the determined groups {v4, v5, v2, v6}, {v4, v5, v2, v3} and {v4, v5, v2, v8} are shown as FIGS. 6A, 6B, and 6C, respectively.

In step S404, an intimacy degree of each group network graph is calculated.

The intimacy degree of the group corresponding to each group to be searched is calculated according to the generated group network graph. Firstly, the intimacy degree between any two nodes is calculated in the group network graph. And then all possible combinations of node intimacy degree are summed to obtain the intimacy degree of the group. Referring to FIG. 6A, the node intimacy degree of {v2, v6}, {v2, v4}, {v2, v5}, {v4, v6}, {v4, v5}, {v5, v6} are calculated, successively. Then the intimacy degree of the 6 nodes are summed to obtain the intimacy degree of the group.

Specifically, a formula of calculating node intimacy degree is:

As for a specified graph G=(V,E), u, v∈V, (u,v)∈E, and the intimacy degree of u and v is:

$$\omega(u, v) = \frac{|N(u) \cap N(v)| + 1}{|N(u) \cup N(v)|},$$

where N(u) is an adjacent node set of node u, |N(u)∩N(v)| is the number of common nodes of node u and node v. In the calculation of the intimacy degree, the numerator is: the number of common nodes of the node u and the node v plus 1, which is mainly to avoid the circumstance that the edge between the two nodes exists while the intimacy degree is 0. The intimacy degree of the graph G=(V,E) is the sum of the intimacy degree of edges between the nodes thereof, which is: $Co(G)=\Sigma_{(u,v)\in E}\omega(u,v)$.

For example, the intimacy degree of social network graph is: $Co(G_A)=\omega(v_2, v_4)+\omega(v2, v5)+\omega(v2, v6)+\omega(v4, v5)+\omega(v4, v6)+\omega(v_5, v_6)=3/4+3/4+3/4+3/4+3/4+3/4=9/2$; $Co(G_B)=\omega(v_2, v_3)+\omega(v_2, v_5)+\omega(v_2, v_4)+\omega(v_4, v_5)+\omega(v_4, v_3)+\omega(v_5, v_3)=1/2+3/4+1/2+1/2+3/2+1/2=17/4$; $Co(G)=\omega(v_2, v_4)+\omega(v_2, v_5)+\omega(v_2, v_8)+\omega(v_4, v_5)+\omega(v_4, v_8)+\omega(v_5, v_8)=1/2+1/2+1/4+2/3+1+1=47/12$.

By comparison, it can be seen that $Co(G_A)>Co(G_B)>Co(G_C)$. Thus, the group pushed to the query terminal is the group shown in FIG. 6A.

In step S406, the group to be searched corresponding to the group network graph with the greatest degree of intimacy degree is fed back to the query terminal and displayed as the query result.

According to an embodiment, when there exists multiple groups searched by the layer expansion satisfying the query conditions (the group size and the group corivitity), it is also possible to calculate the coritivity of each determined group to be searched. If a maximum coritivity exists, the group to be searched having the maximum coritivity will be returned to the query terminal as the query result for displaying. Referring to FIGS. 6A-6C, the group coritivity are 3, 2, 1, respectively. If the group coritivity defined by the query conditions is 1, the three groups to be searched all satisfy the query conditions, the result is then pushed according to the value of the group corivitity. In other words, the group to be searched which has the maximum group coritivity will be pushed to the query terminal for displaying.

Figure 10:
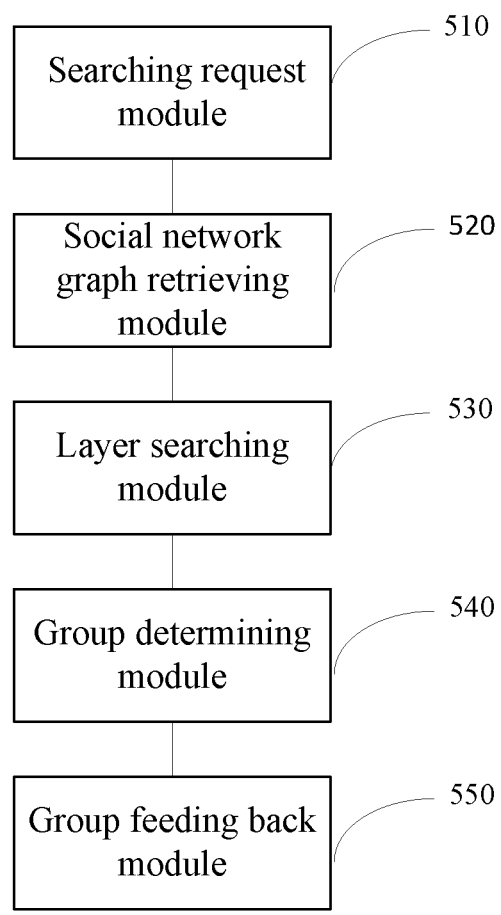
FIG. 10 is a block diagram of a device of searching a group based on a social network according to an embodiment.

According to an embodiment, referring to FIG. 10, a device of searching a group based on a social network is provided, which includes:

A searching request module 510 is used to receive a group search request transmitted by a query terminal. The group search request contains a specified query user ID, a specified group scale, and a group coritivity. The group coritivity defines a minimum number of group members adjacent to other members.

A social network graph retrieving module 520 is used to retrieve a pre-generated social network graph in response to the group search request. The social network graph is generated according to social relation data in a social network site, and the social network graph includes a plurality of user nodes and an edge set used to connect the user nodes.

A layer searching module 530 is used to perform search expansion at a specified number of layers using the user node corresponding to the query user ID as a starting node according to the social network graph. A layer searching module 530 is used to determine a user node having a maximum number of adjacent nodes in the social network graph as a group member in each search expansion layer, which guarantees that the number of the determined group members satisfies the specified group scale.

The user node included in a first level of the expansion layer in an expansion process is an adjacent node of the query user, and the user node included in a next level of expansion layer is the user node adjacent to the group member determined by an upper level of the expansion layer.

A group determining module 540 is used to form a group to be searched by the determined group members and the query user.

A group feeding back module 550 is used to determine whether a group coritivity of the group to be searched is no less than the specified group coritivity or not, and used to feed back the group to be searched as a query result to the query terminal for displaying when the group coritivity of the group to be searched is no less than the specified group coritivity.

Figure 11:
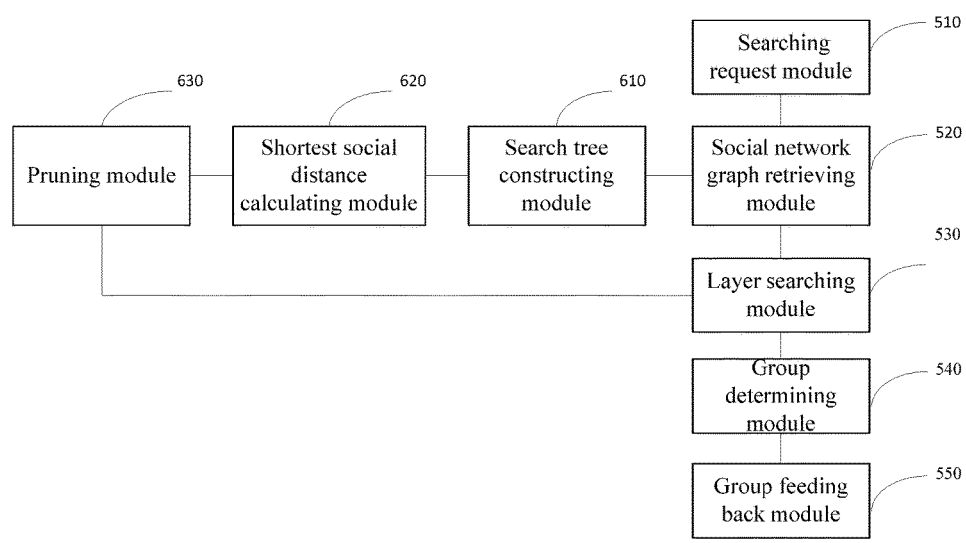
FIG. 11 is a block diagram of a device of searching a group based on a social network according to another embodiment.

According to an embodiment, referring to FIG. 11, a device of searching a group based on a social network includes:

A search tree constructing module 610 is used to construct a BFS tree using the user node corresponding to the query user ID as a root node. The BFS tree traverses all the user nodes starting from the query user identification in the social network graph, successively.

A shortest social distance calculating module 620 is used to determine the shortest social distance from each user node to the root node according to the constructed BFS tree.

A pruning module 630 is used to calculate a difference between the group scale and the shortest social distance. The user node corresponding to the difference being not greater than 1 is defined as a pruning node, and the pruning node and an edge set associated with the pruning node in the social network graph are removed, and a pruned social network graph is generated.

According to an embodiment, the pruning module 630 is further used to search and determine whether there exists a user node corresponding to the node coritivity being less than the group coritivity in the user nodes of the pruned social network graph or not, the node coritivity is the number of nodes adjacent to of the user node. The pruning module 630 is further used to remove the searched user node from the pruned social network and update the pruned social network graph when the user node exists.

Figure 12:
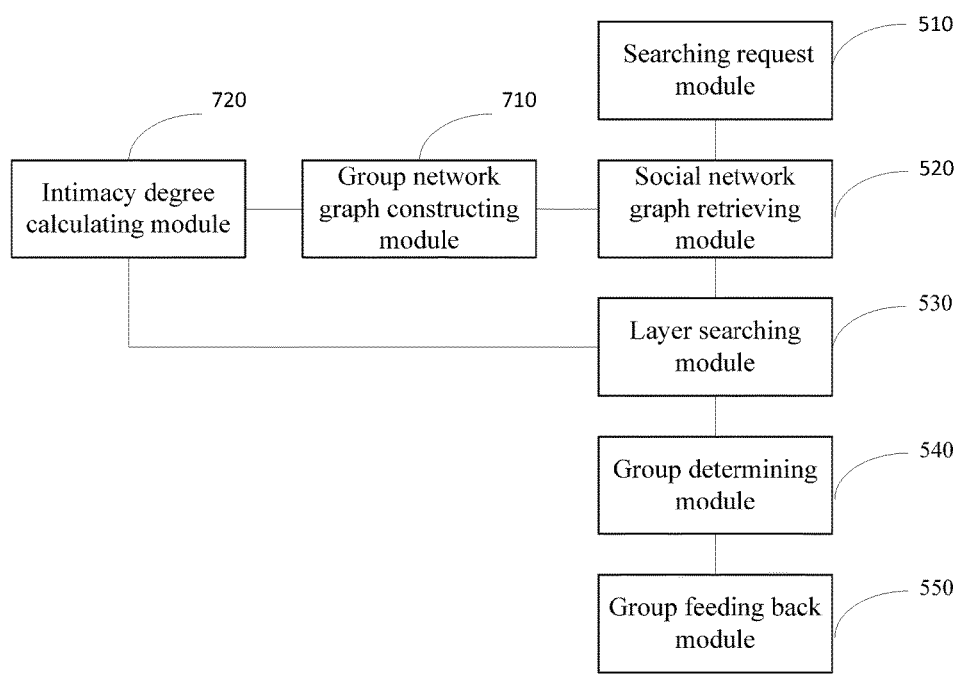
FIG. 12 is a block diagram of a device of searching a group based on a social network according to a yet another embodiment.

According to an embodiment, referring to FIG. 12, there is a plurality of determined groups to be searched, and the device further includes:

A group network graph constructing module 710 is used to determine edge sets between the group members in the groups to be searched according to the social network graph. The group network graph constructing module 710 is used to construct a group network graph of each group to be searched using the group members as the user nodes according to the determined edge sets.

An intimacy degree calculating module 720 is used to calculate the intimacy degree of each group network graph.

The group feeding back module 550 is further used to feed back the group to be searched corresponding to the group network graph with a maximum intimacy degree as the query result to the query terminal for displaying.

According to an embodiment, a formula of calculating an intimacy degree of the group network graph is:

Co(G) is the intimacy degree of the group, G=(V,E) is the group network graph, V is a set of vertices in the group network graph, E is an edge set in the group network graph, nodes u, v∈V, and (u,v)∈E, $$\omega(u, v) = \frac{|N(u) \cap N(v)| + 1}{|N(u) \cup N(v)|}$$

N(u) is an adjacent node set of node u, N(u)∩N(v)| is the number of common nodes of node u and node v.

The various modules of network access behavior recognition device can be implemented, in part or as a whole, by software, hardware or the combinations thereof. Among them, the network interface can be an Ethernet card or wireless card. The aforementioned modules can be embedded in or independent from the processor(s) of the server, or be stored in a memory of server and in the form of software, so as to facilitate the processor(s) to execute corresponding steps of the aforementioned various modules. The processor may be a central processing unit (CPU), a microprocessor, a microcontroller, or the like.

A person skilled in the art should understand that the processes of the methods in the above embodiments can be, in full or in part, implemented by computer programs instructing underlying hardware. The programs can be stored in a computer-readable storage medium and executed by at least one processor in the computer operating system. The program can include the processes in the embodiments of the various methods when it is being executed. The storage medium can be a disk, a CD, a Read-Only Memory (ROM).

Although the respective embodiments have been described one by one, it shall be appreciated that the respective embodiments will not be isolated. Those skilled in the art can apparently appreciate upon reading the disclosure of this application that the respective technical features involved in the respective embodiments can be merged arbitrarily between the respective embodiments as long as they have no collision with each other. Of course, the respective technical features mentioned in the same embodiment can also be merged arbitrarily as long as they have no collision with each other.

Although the invention is illustrated and described herein with reference to specific embodiments, the invention is not intended to be limited to the details shown. It should be noted that any variation or replacement readily figured out by a person skilled in the art within the technical scope disclosed in the present invention shall all fall within the protection scope of the present invention. Therefore, the protection scope of the present invention shall be subject to the protection scope of the appended claims.

What is claimed is:

1. A method of searching a group based on a social network, comprising:
   receiving a group search request transmitted by a query terminal, wherein the group search request contains a specified query user identification (ID), a specified group scale, and a group coritivity, wherein the group coritivity defines a minimum number of group members adjacent to other members;
   retrieving a pre-generated social network graph in response to the group search request, wherein the social network graph is generated according to social relation data in a social network site, and the social network graph comprises a plurality of user nodes and an edge set configured to connect the user nodes;
   constructing a breadth first search (BFS) tree using the user node corresponding to the query user ID as a root node, wherein the BFS tree traverses all the user nodes in the social network graph starting from the query user ID, successively;
   determining a shortest social distance from each user node to the root node according to the constructed BFS tree;

calculating a difference between the group scale and the shortest social distance, wherein the user node corresponding to the difference being not greater than 1 is defined as a pruning node;

removing the pruning node and an edge set associated with the pruning node in the social network graph, and generating a pruned social network graph;

searching whether there exists a user node corresponding to the node coritivity being less than the group coritivity in the user nodes of the pruned social network graph or not, wherein the node coritivity is the number of nodes adjacent to the user node, removing the searched user node from the pruned social network and updating the pruned social network graph when the user node exists;

performing search expansion using the user node corresponding to the query user ID as a starting node according to the social network graph, and determining a user node having a maximum number of adjacent nodes in the social network graph as a group member in each search expansion layer until the number of determined group members equals to the group scale; wherein the user node included in a first level of the expansion layer is an adjacent node of the query user, and the user node included in a next level of expansion layer is the user node adjacent to the group member determined by an upper level of the expansion layer;

forming a group to search by the determined group members and the query user; and determining whether a group coritivity of the group to search is no less than the specified group coritivity or not, and feeding back the group to search as a query result to the query terminal for displaying when the group coritivity of the group to search is no less than the specified group coritivity.

2. The method of claim 1, wherein performing the search expansion using the user node corresponding to the query user ID as the starting node according to the social network graph, and determining the user node having the maximum number of adjacent nodes in the social network graph as the group member in each search expansion layer until the number of determined group members equals to the group scale; wherein the user node included in a first level of the expansion layer is an adjacent node of the query user, and the user node included in a next level of expansion layer is the user node adjacent to the group member determined by an upper level of the expansion layer, comprises:

locating the user node at which the query user ID is located in the social network graph, and performing a layer expansion using the located user node as the starting node to generate a first expansion layer of an expansion subgraph, wherein the user node included in the first expansion layer is the user node adjacent to the query user;

determining a group member from the first expansion layer of the expansion subgraph, wherein the user node corresponding to the group member is the user node having the maximum number of adjacent nodes in the social network graph; and performing an expansion of the next level of expansion layer of the expansion subgraph using the user node corresponding to the group member in the first expansion layer as the starting node, and determining a new group member in a corresponding expansion layer until the number of the determined group members equals to the group scale.

3. The method of claim 1, wherein there is a plurality of determined groups to search; the method further comprises:

determining edge sets between the group members in the groups to search according to the social network graph, and constructing a group network graph of each group to search using the group members as the user nodes according to the determined edge sets;

calculating an intimacy degree of each group network graph; and feeding back the group to search corresponding to the group network graph with a maximum intimacy degree as the query result to the query terminal for displaying.

4. The method of claim 3, wherein a formula of calculating the intimacy degree of the group network graph is:

$$Co(G) = \Sigma_{(u,v) \in E} \omega(u, v)$$

wherein Co(G) is the intimacy degree of the group, G=(V,E) is the group network graph, V is a set of vertices in the group network graph, E is an edge set in the group network graph, nodes u, v∈V, and (u,v)∈E, $$\omega(u, v) = \frac{|N(u) \cap N(v)| + 1}{|N(u) \cup N(v)|},$$

wherein N(u) is an adjacent node set of node u, |N(u)∩N(v)| is the number of common nodes of node u and node v.

5. A server comprising a processor, and a memory storing computer executable instructions, which, when executed by the processor cause the processor to perform steps comprising:

receiving a group search request transmitted by a query terminal, wherein the group search request contains a specified query user identification (ID), a specified group scale, and a group coritivity, wherein the group coritivity defines a minimum number of group members adjacent to other members;

retrieving a pre-generated social network graph in response to the group search request, wherein the social network graph is generated according to social relation data in a social network site, and the social network graph comprises a plurality of user nodes and an edge set configured to connect the user nodes;

performing search expansion using the user node corresponding to the query user ID as a starting node according to the social network graph, and determining a user node having a maximum number of adjacent nodes in the social network graph as a group member in each search expansion layer until the number of determined group members equals to the group scale; wherein the user node included in a first level of the expansion layer is an adjacent node of the query user, and the user node included in a next level of expansion layer is the user node adjacent to the group member determined by an upper level of the expansion layer;

forming a group to search by the determined group members and the query user; and determining whether a group coritivity of the group to search is no less than the specified group coritivity or not, and feeding back the group to search as a query result to the query terminal for displaying when the group coritivity of the group to search is no less than the specified group coritivity.

6. The server of claim 5, wherein after executing step of retrieving a pre-generated social network graph in response to the group search request, wherein the social network graph is generated according to social relation data in a social network site, and the social network graph comprises a plurality of user nodes and an edge set configured to connect the user nodes, the processor further executes steps comprising:
constructing a BFS tree using the user node corresponding to the query user ID as a root node, wherein the BFS tree traverses all the user nodes in the social network graph starting from the query user ID, successively;
determining a shortest social distance from each user node to the root node according to the constructed BFS tree; and
calculating a difference between the group scale and the shortest social distance, wherein the user node corresponding to the difference being not greater than 1 is defined as a pruning node, removing the pruning node and an edge set associated with the pruning node in the social network graph, and generating a pruned social network graph.

7. The server of claim 6, wherein after executing step of calculating the difference between the group scale and the shortest social distance, the user node corresponding to the difference being not greater than 1 is defined as a pruning node, the pruning node and the edge set associated with the pruning node are removed in the social network graph, and generating the pruned social network graph, the processor further executes steps comprising:
searching whether there exists a user node corresponding to the node coritivity being less than the group coritivity in the user nodes of the pruned social network graph or not, wherein the node coritivity is the number of nodes adjacent to of the user node, and
removing the searched user node from the pruned social network and updating the pruned social network graph when the user node exists.

8. The server of claim 5, wherein the processor executes performing the search expansion using the user node corresponding to the query user ID as the starting node according to the social network graph, and determining the user node having the maximum number of adjacent nodes in the social network graph as the group member in each search expansion layer until the number of determined group members equals to the group scale;
wherein the user node included in a first level of the expansion layer is an adjacent node of the query user, and the user node included in a next level of expansion layer is the user node adjacent to the group member determined by an upper level of the expansion layer, which comprises:
locating the user node at which the query user ID is located in the social network graph, and performing a layer expansion using the located user node as the starting node to generate a first expansion layer of an expansion subgraph, wherein the user node included in the first expansion layer is the user node adjacent to the query user;
determining a group member from the first expansion layer of the expansion subgraph, wherein the user node corresponding to the group member is the user node having the maximum number of adjacent nodes in the social network graph; and
performing an expansion of the next level of expansion layer of the expansion subgraph using the user node corresponding to the group member in the first expansion layer as the starting node, and determining a new group member in a corresponding expansion layer until the number of the determined group members equals to the group scale.

9. The server of claim 5, wherein there is a plurality of determined groups to search; the processor further executes following steps:
determining edge sets between the group members in the groups to search according to the social network graph, and constructing a group network graph of each group to search using the group members as the user nodes according to the determined edge sets;
calculating an intimacy degree of each group network graph; and
feeding back the group to search corresponding to the group network graph with a maximum intimacy degree as the query result to the query terminal for displaying.

10. The server of claim 9, wherein a formula of calculating the intimacy degree of the group network graph is:

$$Co(G)=\Sigma_{(u,v)\in E}\omega(u,v)$$

wherein Co(G) is the intimacy degree of the group, G=(V,E) is the group network graph, V is a set of vertices in the group network graph, E is an edge set in the group network graph,
nodes u,v∈V, and (u,v)∈E, $$\omega(u,v) = \frac{|N(u) \cap N(v)| + 1}{|N(u) \cup N(v)|},$$

wherein N(u) is an adjacent node set of node u, |N(u)∩N(v)| is the number of common nodes of node u and node v.

11. At least one non-transitory computer-readable medium storing computer executable instructions, which, when executed by at least one processor cause the at least one processor to perform steps comprising:
receiving a group search request transmitted by a query terminal, wherein the group search request contains a specified query user identification (ID), a specified group scale, and a group coritivity, wherein the group coritivity defines a minimum number of group members adjacent to other members;
retrieving a pre-generated social network graph in response to the group search request, wherein the social network graph is generated according to social relation data in a social network site, and the social network graph comprises a plurality of user nodes and an edge set configured to connect the user nodes;
performing search expansion using the user node corresponding to the query user ID as a starting node according to the social network graph, and determining a user node having a maximum number of adjacent nodes in the social network graph as a group member in each search expansion layer until the number of determined group members equals to the group scale;
wherein the user node included in a first level of the expansion layer is an adjacent node of the query user, and the user node included in a next level of expansion layer is the user node adjacent to the group member determined by an upper level of the expansion layer;
forming a group to search by the determined group members and the query user; and
determining whether a group coritivity of the group to search is no less than the specified group coritivity or not, and feeding back the group to search as a query result to the query terminal for displaying when the group coritivity of the group to search is no less than the specified group coritivity.

12. The non-transitory computer-readable medium of claim 11, wherein after executing step of retrieving a pre-generated social network graph in response to the group search request, wherein the social network graph is generated according to social relation data in a social network site, and the social network graph comprises a plurality of user nodes and an edge set configured to connect the user nodes, the processor further executes steps comprising:
constructing a BFS tree using the user node corresponding to the query user ID as a root node, wherein the BFS tree traverses all the user nodes in the social network graph starting from the query user ID, successively;
determining a shortest social distance from each user node to the root node according to the constructed BFS tree; and
calculating a difference between the group scale and the shortest social distance, wherein the user node corresponding to the difference being not greater than 1 is defined as a pruning node, removing the pruning node and an edge set associated with the pruning node in the social network graph, and generating a pruned social network graph.

13. The non-transitory computer-readable medium of claim 12, wherein after executing step of calculating the difference between the group scale and the shortest social distance, the user node corresponding to the difference being not greater than 1 is defined as a pruning node, the pruning node and the edge set associated with the pruning node are removed in the social network graph, and generating the pruned social network graph, the processor further executes steps comprising:
searching whether there exists a user node corresponding to the node coritivity being less than the group coritivity in the user nodes of the pruned social network graph or not, wherein the node coritivity is the number of nodes adjacent to of the user node, and
removing the searched user node from the pruned social network and updating the pruned social network graph when the user node exists.

14. The non-transitory computer-readable medium of claim 11, the processor executes performing the search expansion using the user node corresponding to the query user ID as the starting node according to the social network graph, and determining the user node having the maximum number of adjacent nodes in the social network graph as the group member in each search expansion layer until the number of determined group members equals to the group scale;
wherein the user node included in a first level of the expansion layer is an adjacent node of the query user, and the user node included in a next level of expansion layer is the user node adjacent to the group member determined by an upper level of the expansion layer, which comprises:
locating the user node at which the query user ID is located in the social network graph, and performing a layer expansion using the located user node as the starting node to generate a first expansion layer of an expansion subgraph, wherein the user node included in the first expansion layer is the user node adjacent to the query user;
determining a group member from the first expansion layer of the expansion subgraph, wherein the user node corresponding to the group member is the user node having the maximum number of adjacent nodes in the social network graph; and
performing an expansion of the next level of expansion layer of the expansion subgraph using the user node corresponding to the group member in the first expansion layer as the starting node, and determining a new group member in a corresponding expansion layer until the number of the determined group members equals to the group scale.

15. The one non-transitory computer-readable medium of claim 11, wherein there is a plurality of determined groups to search; the processor further executes following steps:
determining edge sets between the group members in the groups to search according to the social network graph, and constructing a group network graph of each group to search using the group members as the user nodes according to the determined edge sets;
calculating an intimacy degree of each group network graph; and
feeding back the group to search corresponding to the group network graph with a maximum intimacy degree as the query result to the query terminal for displaying.

16. The non-transitory computer-readable medium of claim 15, wherein a formula of calculating the intimacy degree of the group network graph is:

$$Co(G) = \Sigma_{(u,v) \in E} \omega(u,v)$$

wherein Co(G) is the intimacy degree of the group, G=(V,E) is the group network graph, V is a set of vertices in the group network graph, E is an edge set in the group network graph,
nodes u,v∈V, and (u,v)∈E, $$\omega(u, v) = \frac{|N(u) \cap N(v)| + 1}{|N(u) \cup N(v)|},$$

wherein N(u) is a set of nodes adjacent to of node u, |N(u)∩N(v)| is the number of common nodes of node u and node v.

* * * * *